US009623359B2

(12) United States Patent
Toyoshima et al.

(10) Patent No.: US 9,623,359 B2
(45) Date of Patent: *Apr. 18, 2017

(54) SEALED HONEYCOMB STRUCTURE

(75) Inventors: Tetsuo Toyoshima, Nagoya (JP); Akira Takahashi, Nagoya (JP); Yuichi Hamazaki, Nagoya (JP); Jung Min Seo, Suwon-Si (KR); Won Soon Park, Seongnam-si (KR)

(73) Assignees: HYUNDAI MOTOR COMPANY, Seoul (KR); KIA MOTORS CORPORATION, Seoul (KR); NGK INSULATORS, LTD., Nagoya-shi (JP)

( * ) Notice: Subject to any disclaimer, the term of this patent is extended or adjusted under 35 U.S.C. 154(b) by 536 days.

This patent is subject to a terminal disclaimer.

(21) Appl. No.: 14/009,057

(22) PCT Filed: Mar. 30, 2012

(86) PCT No.: PCT/JP2012/058728
§ 371 (c)(1),
(2), (4) Date: May 13, 2014

(87) PCT Pub. No.: WO2012/133848
PCT Pub. Date: Oct. 4, 2012

(65) Prior Publication Data
US 2014/0311112 A1    Oct. 23, 2014

(30) Foreign Application Priority Data

Mar. 31, 2011 (JP) .................... 2011-078695

(51) Int. Cl.
*B01D 50/00* (2006.01)
*B01D 39/20* (2006.01)
(Continued)

(52) U.S. Cl.
CPC ......... *B01D 46/2418* (2013.01); *B01D 39/20* (2013.01); *B01D 46/00* (2013.01);
(Continued)

(58) Field of Classification Search
CPC .......... B01D 46/247; B01D 2046/2496; Y10T 428/24157; Y10T 428/24149
See application file for complete search history.

(56) References Cited

U.S. PATENT DOCUMENTS 4,335,023 A     6/1982 Dettling et al.
4,857,089 A *   8/1989 Kitagawa ........... B01D 53/9454
                                                    422/180

(Continued)

FOREIGN PATENT DOCUMENTS

CN           101060961 A     10/2007
DE    20 2010 005 586 U1     10/2010
(Continued)

OTHER PUBLICATIONS

European Office Action issued Dec. 1, 2016, in European Patent Application No. 12 765 900.1.

*Primary Examiner* — Amber R Orlando
(74) *Attorney, Agent, or Firm* — Morgan, Lewis & Bockius LLP

(57) ABSTRACT

A sealed honeycomb structure may include porous walls dividedly forming inlet cells and outlet cells extending from an end surface of an inlet side to an end surface of an outlet side, inlet and outlet side sealing portion 5b, and an inlet side sealing portion, wherein at least one outlet cell is a reinforced cell where a reinforcing part 6 for reinforcing the outlet cell 2b is formed at at least one corner portion 21a at which the walls on a cross-section vertical to an extending direction of the cell cross each other, wherein the inlet cell is a non-reinforced cell where the reinforcing part is not formed at all the corner portions at which the walls on the
(Continued)

cross-section vertical to the extending direction of the cell cross each other, and wherein the reinforcing parts 6 of the reinforced cells 22 are formed at a section of the honeycomb structure from the end surface of the outlet side in the extending direction of the cell.

8 Claims, 9 Drawing Sheets

(51) Int. Cl.
  *B01D 39/14* (2006.01)
  *B01D 39/06* (2006.01)
  *B01D 46/24* (2006.01)
  *B01D 46/00* (2006.01)
  *C04B 38/00* (2006.01)
  *F01N 3/022* (2006.01)

(52) U.S. Cl.
  CPC .......... *B01D 46/2474* (2013.01); *C04B 38/00* (2013.01); *B01D 46/247* (2013.01); *B01D 46/2466* (2013.01); *B01D 2046/2492* (2013.01); *B01D 2046/2496* (2013.01); *F01N 3/0222* (2013.01); *F01N 2260/18* (2013.01)

(56) References Cited

U.S. PATENT DOCUMENTS

| | | | |
|---|---|---|---|
| 6,149,877 A | 11/2000 | Ogai | |
| 6,159,431 A * | 12/2000 | Inoue | B01J 35/04 422/177 |
| 7,572,497 B2 | 8/2009 | Hirakawa et al. | |
| 7,722,827 B2 * | 5/2010 | Fischer | B01D 46/2418 422/129 |
| 2003/0165662 A1 | 9/2003 | Suwabe et al. | |
| 2005/0011174 A1 | 1/2005 | Hong et al. | |
| 2005/0191461 A1 | 9/2005 | Kasai et al. | |
| 2007/0128405 A1 | 6/2007 | Sakaguchi et al. | |
| 2007/0148406 A1 * | 6/2007 | Ando | C04B 38/0009 428/118 |
| 2007/0231534 A1 | 10/2007 | Ahmed et al. | |
| 2008/0128082 A1 | 6/2008 | Masuda et al. | |
| 2008/0317999 A1 * | 12/2008 | Patchett | B01D 53/9418 428/116 |
| 2013/0055694 A1 | 3/2013 | Salmona et al. | |
| 2014/0059987 A1 | 3/2014 | Hirakawa et al. | |

FOREIGN PATENT DOCUMENTS

| | | |
|---|---|---|
| EP | 1 568 406 A1 | 8/2005 |
| EP | 2 090 351 A2 | 8/2009 |
| EP | 2 312 133 A1 | 4/2011 |
| GB | 2 071 640 A | 9/1981 |
| JP | 56-129042 A | 10/1981 |
| JP | 2003-269131 A | 9/2003 |
| JP | 2005-270969 A | 10/2005 |
| JP | 2008-129042 A | 6/2008 |
| JP | 2009-532197 A | 9/2009 |
| JP | 2010-427 A | 1/2010 |
| JP | 2010-131586 A | 6/2010 |
| JP | 2010-221159 A | 10/2010 |

* cited by examiner

SEALED HONEYCOMB STRUCTURE

CROSS-REFERENCE TO RELATED APPLICATION

This application is a National Stage of International Patent Application No. PCT/JP2012/058728 filed Mar. 30, 2012 and published as WO 2012/133848, which claims priority to Japanese Patent Application No. 2011-078695 filed Mar. 31, 2011, the entire contents of which applications is incorporated herein for all purposes by this reference.

TECHNICAL FIELD

The present invention relates to a sealed honeycomb structure. More particularly, the present invention relates to a sealed honeycomb structure which can suppress increase of pressure loss and improve durability favorably.

BACKGROUND

Gas exhausted from internal combustion engines such as diesel engines or other combustion devices contains a large amount of particulate matter (PM) having soot as main component. Since the PM directly released into the atmosphere causes environmental pollution, a diesel particulate filter (DPF) for trapping the PM is mounted at an exhaust system of exhaust gas.

A honeycomb structure having a porous wall dividedly forming a plurality of cells that will be channels of fluid (exhaust gas and purified gas) has been used as the DPF. Such a honeycomb structure is used as a sealed honeycomb structure (honeycomb filter) by mounting sealing portions at openings of predetermined cells (inlet cell) disposed on an end surface of an outlet side of fluid (purified gas) and at openings of remaining cells (outlet cell) disposed on an end surface of an inlet side of fluid (exhaust gas).

If the exhaust gas flowing into the inlet cell, the particulate matter in the exhaust gas is trapped at a wall when the exhaust gas passes through the wall and the purified gas from which the particulate matter is eliminated flows out from the outlet cell according to the sealed honeycomb structure.

To prevent damage due to excessive thermal impact or mechanical impact occurring at intersecting points of the walls in conventional honeycomb structures, a ceramic honeycomb structure where a cross-sectional shape of some channels (cells) vertical to an axial direction is such that R portions of arc shape are formed at diagonally confronting corner portions is developed (e.g., please refer to patent document 1). In addition, a honeycomb structure porous where fillets are formed at corner portions of cells dividedly formed by porous walls so as to reinforce the cells is also developed (e.g., please refer to patent document 2). According to such honeycomb structures, thickness of an intersecting part of the walls increases, and thereby, mechanical strength (i.e., durability) may be improved.

BRIEF SUMMARY

Since R portions of arc shape, however, are formed at the corner portions of all cells according to the honeycomb structure disclosed in patent document 1, volume of a channel through which the fluid passes is remarkably reduced. As a result, durability of the sealed honeycomb structure may be deteriorated due to deposits of ash contained in the exhaust gas.

In addition, since an inlet cell into which the fluid flows is also reinforced, the volume of the channel (particularly, volume of the inlet side of the fluid) is reduced according to the honeycomb structures disclosed in patent document 1 and patent document 2. Therefore, a filter area that is an area of a filter actually operating as a filter is reduced and pressure loss of the sealed honeycomb structure may increase.

Because mass of the sealed honeycomb structure also increases by forming the reinforcing part, forming the reinforcing part excessively may cause deterioration of performance of the sealed honeycomb structure. If the mass of the sealed honeycomb structure, for example, increases, a time for reaching a required temperature for purifying the exhaust gas also increases. Therefore, purifying performance of the exhaust gas may be deteriorated. In addition, a temperature of the exhaust gas may be raised so as to keep the purifying performance. In this case, fuel consumption of an internal combustion engine of vehicles may be deteriorated.

That is, the reinforcing part is formed so as to improve strength of the honeycomb structure according to the conventional honeycomb structures. In this case, durability may be improved by forming the reinforcing part but other characteristics of the filter such as the pressure loss or the purifying performance may be deteriorated. Particularly, improvement of strength and increase of the pressure loss in the honeycomb structure are regarded to be incompatible. Therefore, it is very difficult to obtain both of them.

The present invention has been made in an effort to provide a sealed honeycomb structure having advantages of suppressing increase of pressure loss by sufficiently securing a volume of a cell (inlet cell) into which fluid flows and improving durability favorably.

According to the present invention, a sealed honeycomb structure will be provided as follows:

(1) A sealed honeycomb structure including a honeycomb structure having porous walls dividedly forming a plurality of cells extending from an end surface of an inlet side to an end surface of an outlet side, the plurality of cells being a plurality of fluid channels; an outlet side sealing portion mounted at openings of predetermined cells in the end surface of the outlet side so as to form inlet cells where the end surface of the inlet side is open and the end surface of the outlet side is sealed; and an inlet side sealing portion mounted at openings of remaining cells in the end surface of the inlet side so as to form outlet cells where the end surface of the outlet side is open and the end surface of the inlet side is sealed, wherein at least one cell among the outlet cells is a reinforced cell where a reinforcing part for reinforcing the outlet cell is formed at at least one corner portion at which the walls on a cross-section vertical to an extending direction of the cell cross each other, wherein the inlet cell is provided with a reinforcing part for reinforcing the inlet cell at at least one corner portion at which the walls on the cross-section vertical to the extending direction of the cell cross each other, wherein the number of the corner portions reinforcing the inlet cell is smaller than the number of the corner portions reinforcing the outlet cell, wherein the reinforcing parts of the outlet cells are formed at a section of the honeycomb structure from the end surface of the outlet side of the honeycomb structure in the extending direction of the cell, and wherein the reinforcing parts of the inlet cells are formed at a section of the honeycomb structure from the end surface of the inlet side of the honeycomb structure in the extending direction of the cell.

(2) A sealed honeycomb structure including a honeycomb structure having porous walls dividedly forming a plurality of cells extending from an end surface of an inlet side to an end surface of an outlet side, the plurality of cells being a plurality of fluid channels; an outlet side sealing portion mounted at openings of predetermined cells in the end surface of the outlet side so as to form inlet cells where the end surface of the inlet side is open and the end surface of the outlet side is sealed; and an inlet side sealing portion mounted at openings of remaining cells in the end surface of the inlet side so as to form outlet cells where the end surface of the outlet side is open and the end surface of the inlet side is sealed, wherein at least one cell among the outlet cells is a reinforced cell where a reinforcing part for reinforcing the outlet cell is formed at at least one corner portion at which the walls on a cross-section vertical to an extending direction of the cell cross each other, wherein the inlet cell is a non-reinforced cell where the reinforcing part is not formed at all the corner portions at which the walls on the cross-section vertical to the extending direction of the cell cross each other, and wherein the reinforcing parts of the reinforced cells are formed at a section of the honeycomb structure from the end surface of the outlet side of the honeycomb structure in the extending direction of the cell.

(3) The sealed honeycomb structure described in (1), wherein a length of the reinforcing part in the extending direction of the cell is larger than or equal to a length of the outlet side sealing portion or the inlet side sealing portion in the extending direction of the cell.

(4) The sealed honeycomb structure described in (2), wherein a length of the reinforcing part in the extending direction of the cell is larger than or equal to a length of the outlet side sealing portion or the inlet side sealing portion in the extending direction of the cell.

(5) The sealed honeycomb structure described in any one of (1) to (4), wherein the reinforcing part is formed on the section corresponding to a range smaller than or equal to ⅓ of the length of the honeycomb structure in the extending direction of the cell from the end surface of the outlet side or the end surface of the inlet side of the honeycomb structure.

(6) The sealed honeycomb structure described in any one of (1) to (5), wherein the reinforced cell comprises a reinforced corner portion at which the reinforcing part is formed and a non-reinforced corner portion at which the reinforcing part is not formed.

(7) The sealed honeycomb structure described in any one of (1) to (6), wherein the reinforced cell is configured that the reinforcing parts are formed at all the corner portions of the reinforced cell at the end surface of the outlet side or the end surface of the inlet side of the honeycomb structure.

(8) The sealed honeycomb structure described in any one of (1) to (7), wherein the inlet cell and the outlet cell are alternately disposed across the wall.

(9) The sealed honeycomb structure described in any one of (1) to (8), wherein a ratio of an intersecting distance of an intersecting part of the walls to an average thickness of the wall without the reinforcing part is within a range of 1.5 to 9.3, and wherein the intersecting distance of the intersecting part of the walls is a distance from a surface of the reinforcing part of the reinforced cell to a surface of another cell disposed across an intersecting point of the walls dividedly forming the reinforced cells.

(10) The sealed honeycomb structure described in any one of (1) to (9), wherein each reinforcing part occupies 0.05 to 20% of an area of an opening portion without the reinforcing part on the cross-section vertical to the extending direction of the cell.

According to a sealed honeycomb structure of the present invention, at least one cell among "outlet cells where an end surface of an outlet side is open and an end surface of an inlet side is sealed" is a reinforced cell where a reinforcing part for reinforcing the outlet cell is formed at at least one corner portion at which walls on a cross-section vertical to an extending direction of the cell cross each other, and an "inlet cell where the end surface of the inlet side is open and the end surface of the outlet side is sealed" has a reinforcing part for reinforcing the inlet cell formed at at least one corner portion at which walls on the cross-section vertical to the extending direction of the cell cross each other wherein the number of the corner portions reinforcing the inlet cells is smaller than the number of the corner portions reinforcing the outlet cells, or the inlet cell is a non-reinforced cell where the reinforcing part is not formed at all the corner portions at which the walls on the cross-section vertical to the extending direction of the cell cross each other. Therefore, volume and opening area of the inlet cell where the reinforcing part is not formed (i.e., non-reinforced cell) can be sufficiently secured. Therefore, increase of pressure loss may be suppressed. Meanwhile, the reinforcing part is formed at at least one corner portion of the outlet cell which has smaller influence on pressure loss than the inlet cell does. Durability of the sealed honeycomb structure may be improved favorably by forming the reinforcing part. Therefore, mechanical strength of the sealed honeycomb structure may be excellent. In addition, the reinforcing parts of the reinforced cells are formed at a section of the honeycomb structure from the end surface of the outlet side of the honeycomb structure in the extending direction of the cell. Therefore, the end surface of the outlet side where a temperature is easily changed over time can be reinforced favorably if the sealed honeycomb structure is used as a filter such as a DPF. Therefore, breakage due to thermal impact may be effectively prevented.

Occupying volume of the reinforcing part in the channel according to the sealed honeycomb structure of the present exemplary embodiment is less than half of that according to a conventional honeycomb structure having the inlet cells and the outlet cells where the reinforcing part is formed. However, durability of the honeycomb structure can be improved more than volume ratio of the reinforcing part. In addition, since the number of the reinforcing parts formed at the outlet cells at which maximum thermal stress occurs in the sealed honeycomb structure is greater than the number of the reinforcing parts formed at the inlet cells, or only the outlet cells are reinforced, excess increase in mass of the sealed honeycomb structure may be suppressed. Therefore, if the sealed honeycomb structure is mounted at an exhaust gas channel of an internal combustion engine, the sealed honeycomb structure is easily heated and degradation of purifying performance of exhaust gas may be suppressed favorably. In addition, even though temperature of the sealed honeycomb structure is controlled by temperature of the exhaust gas, deterioration of fuel economy of the internal combustion engine may be suppressed because the sealed honeycomb structure is easily heated. According to the sealed honeycomb structure of the present invention, improvement of durability of the honeycomb structure and suppression of increase of pressure loss that were regarded as trade-off relation may be satisfied. In addition, degradation of purifying performance or fuel consumption of the internal combustion engine may be suppressed. In addition, since volume is not reduced by deposition of ash, the sealed honeycomb structure according to the present exemplary embodiment may improve strength of the honeycomb structure without influence on the increase of the pressure loss, cleaning period of the ash, and replacement period of a filter of purifying the exhaust gas (for example, DPF) after the ash is deposited.

DETAILED DESCRIPTION

Figure 1:
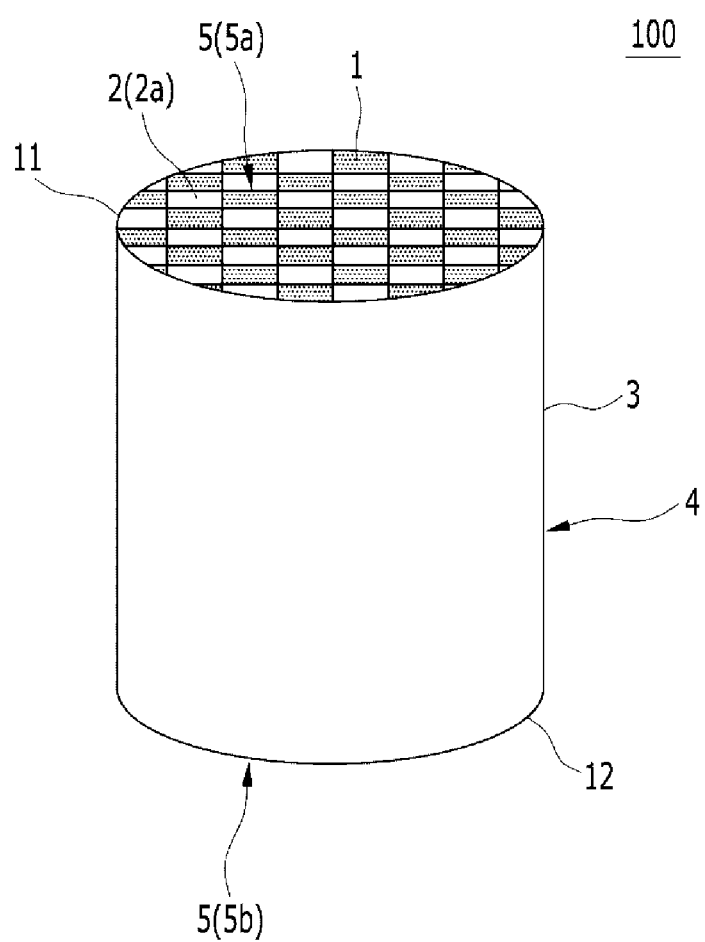
FIG. 1 is a perspective view of a sealed honeycomb structure according to an exemplary embodiment of the present invention.

Exemplary embodiments of the present invention will hereinafter be described in detail with reference to the accompanying drawings. Exemplary embodiments described in this specification and drawings are just exemplary embodiments of the present invention. It is to be understood that there can be various modifications and equivalents included in the spirit of the present invention at the filing of this application.

Sealed Honeycomb Structure

As shown in FIG. 1 to FIG. 5, one exemplary type of a sealed honeycomb structure of the present invention (sealed honeycomb structure 100) is a sealed honeycomb structure 100 including "a honeycomb structure 4 having porous walls 1 dividedly forming a plurality of cells 2 being fluid channels extending from an end surface 11 of an inlet side to an end surface 12 of an outlet side", "an outlet side sealing portion 5b mounted at openings of predetermined cells in the end surface 12 of the outlet side so as to form inlet cells 2a where the end surface 11 of the inlet side is open and the end surface 12 of the outlet side is sealed", and "an inlet side sealing portion 5a mounted at openings of remaining cells in the end surface 11 of the inlet side so as to form outlet cells 2b where the end surface 12 of the outlet side is open and the end surface 11 of the inlet side is sealed".

At least one cell among the outlet cells 2b is a reinforced cell 22 where a reinforcing part 6 for reinforcing the outlet cell 2b is formed at at least one corner portion 21a at which the walls 1 on a cross-section vertical to an extending direction of the cell 2 cross each other. In addition, the inlet cell 2a is a non-reinforced cell 23 where the reinforcing part 6 is not formed at all the corner portions 21 at which the walls 1 on the cross-section vertical to the extending direction of the cell 2 cross each other.

In addition, the reinforcing part 6 of the reinforced cell 22 is formed at a section of the honeycomb structure 4 from the end surface of the outlet side 12 in the extending direction of the cell 2 according to the sealed honeycomb structure 100 of the present exemplary embodiment. That is, the reinforcing part 6 is not formed at an entire section of the honeycomb structure 4 in the extending direction of the cell 2 but is formed at a predetermined section from the end surface of the outlet side 12 of the honeycomb structure 4 in the extending direction of the cell 2 according to the sealed honeycomb structure 100 of the present exemplary embodiment.

In other words, the reinforcing part 6 is not formed at the inlet cell 2a into which the fluid flows according to the sealed honeycomb structure 100 of the present exemplary embodiment. Therefore, the inlet cells 2a, for example, are dividedly formed by the walls 1 having a uniform wall thickness. All the inlet cells 2a formed in the sealed honeycomb structure 100 are the non-reinforced cells 23.

Meanwhile, the reinforcing part 6 is formed at at least one corner portion 21a at which the walls 1 cross in at least one cell among the outlet cells 2b and at the section of the honeycomb structure 4 from the end surface of the outlet side 12 in the extending direction of the cell 2, and some cells among the outlet cells 2b are the reinforced cells 22 with the corner portion 21a being reinforced. All the outlet cells 2b may be the reinforced cells 22, or some cells among the outlet cells 2b are the reinforced cells 22 and the outlet cells 2b other than the reinforced cells 22, the same as the inlet cells 2a, may be the non-reinforced cells where the reinforcing part 6 is not formed according to the sealed honeycomb structure of the present exemplary embodiment.

Figure 2:
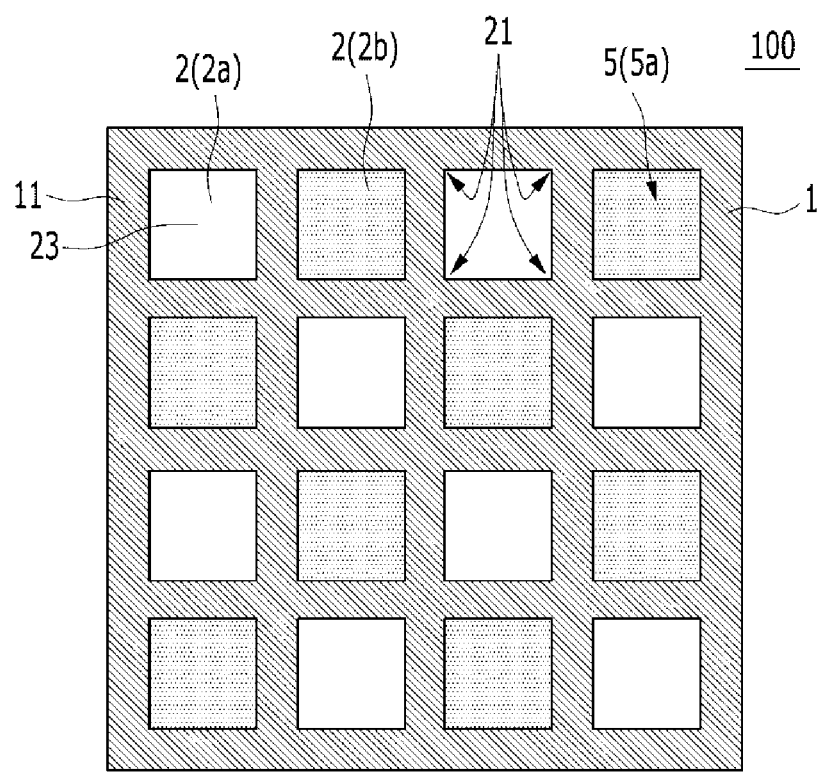
FIG. 2 is a schematic diagram of a sealed honeycomb structure with an end surface of an inlet side being enlarged according to an exemplary embodiment of the present invention.
Figure 3:
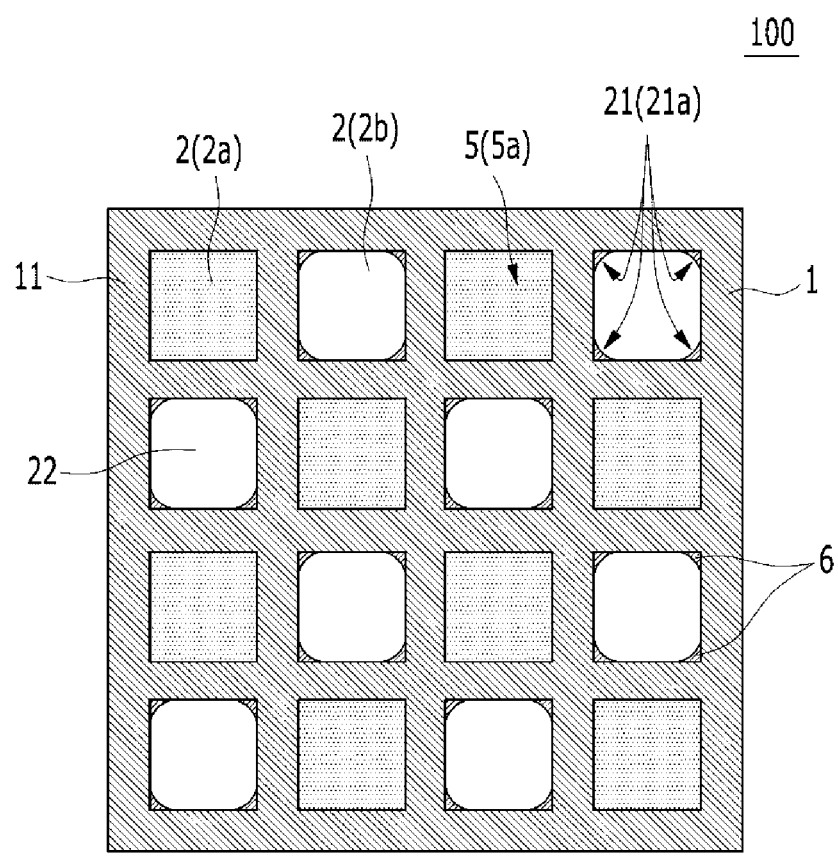
FIG. 3 is a schematic diagram of a sealed honeycomb structure with an end surface of an outlet side being a sealed honeycomb structure according to an exemplary embodiment of the present invention.
Figure 4:
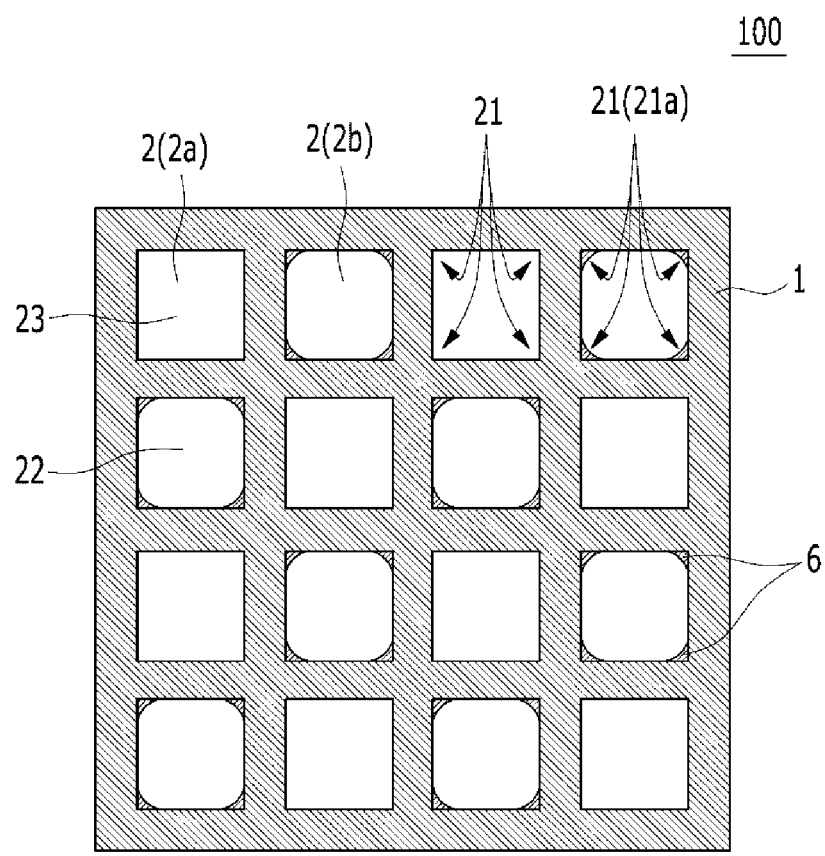
FIG. 4 is a schematic diagram of an enlarged cross-section vertical to an extending direction of a cell in a sealed honeycomb structure according to an exemplary embodiment of the present invention.
Figure 5:
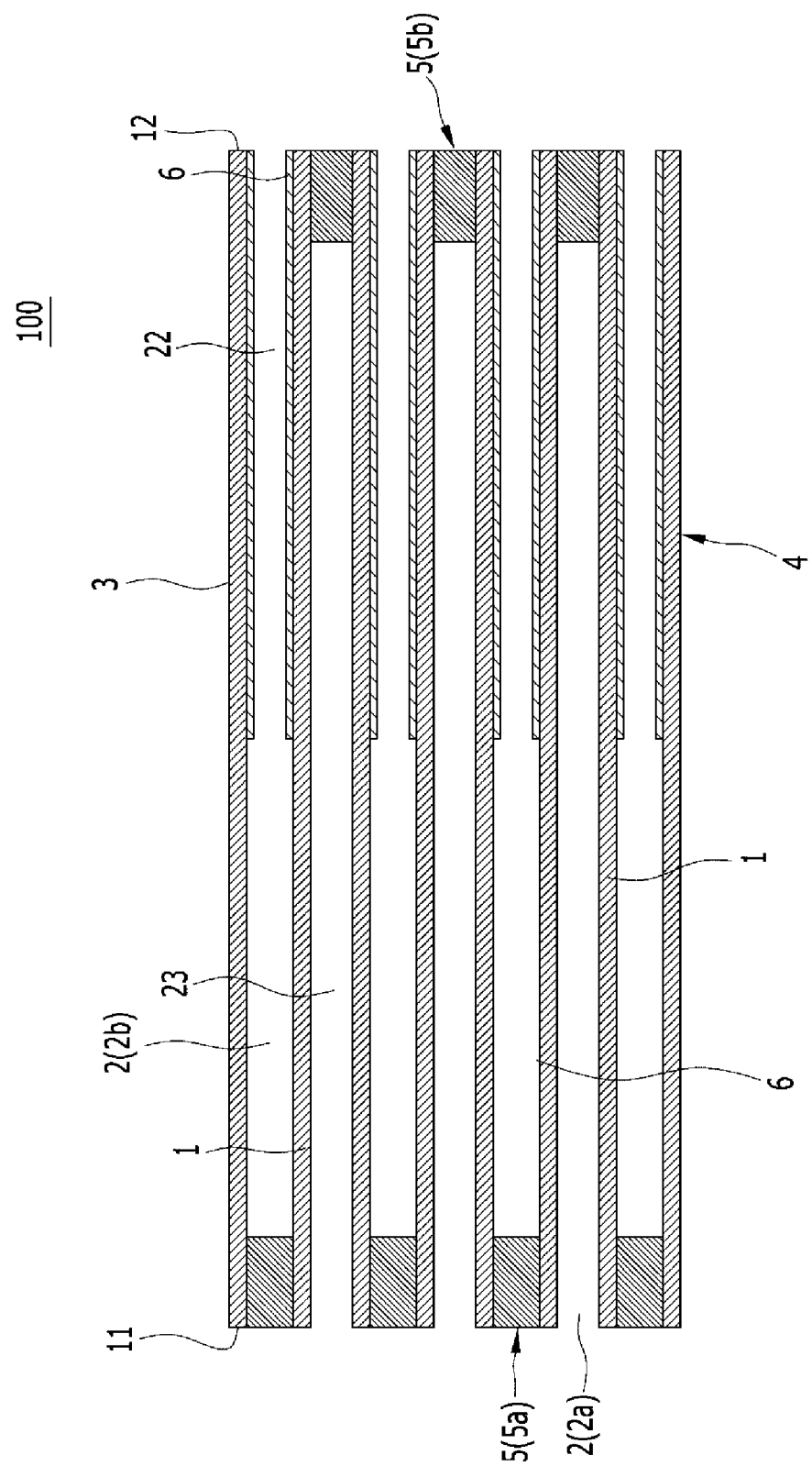
FIG. 5 is a schematic diagram of a cross-section parallel to an extending direction of a cell in a sealed honeycomb structure according to an exemplary embodiment of the present invention.

Herein, FIG. 1 is a perspective view of a sealed honeycomb structure according to an exemplary embodiment of the present invention. FIG. 2 is a schematic diagram of a sealed honeycomb structure with an end surface of an inlet side being enlarged according to an exemplary embodiment of the present invention. FIG. 3 is a schematic diagram of a sealed honeycomb structure with an end surface of an outlet side being a sealed honeycomb structure according to an exemplary embodiment of the present invention. FIG. 4 is a schematic diagram of an enlarged cross-section vertical to an extending direction of a cell in a sealed honeycomb structure according to an exemplary embodiment of the present invention. FIG. 5 is a schematic diagram of a cross-section parallel to an extending direction of a cell in a sealed honeycomb structure according to an exemplary embodiment of the present invention.

The sealed honeycomb structure 100 according to the present exemplary embodiment can sufficiently secure volume of the inlet cells 2a (i.e., non-reinforced cells 23) where the reinforcing part 6 is not formed and opening area (filter area) of the inlet cells 2a. Therefore, increase in pressure loss of the sealed honeycomb structure can be suppressed favorably. improved by forming the reinforcing part 6 at at least one corner portion 21a at which the walls 1 cross in the outlet cells 2b that have less influence on the pressure loss than the inlet cells 2a do. Therefore, mechanical strength of the sealed honeycomb structure 100 may be enhanced.

Particularly, occupying volume of the reinforcing part 6 in the channel (cell 2) according to the sealed honeycomb structure 100 of the present exemplary embodiment is less than half of that according to a conventional honeycomb structure having the inlet cells and the outlet cells where the reinforcing part is formed. However, durability of the honeycomb structure can be improved more than volume ratio of the reinforcing part 6.

In addition, excessive increase in the mass of the sealed honeycomb structure 100 can be suppressed by reinforcing only the outlet cells 2b where thermal stress is maximized in the sealed honeycomb structure 100. Therefore, the sealed honeycomb structure 100 may be easily heated and degradation in performance of purifying the exhaust gas may be suppressed favorably in a case that the sealed honeycomb structure 100 is mounted at an exhaust gas channel of an internal combustion engine. In addition, even though the temperature of the sealed honeycomb structure 100 is controlled by the temperature of the exhaust gas, deterioration in fuel consumption of the internal combustion engine of the vehicle may be suppressed because the sealed honeycomb structure 100 can be easily heated. Further, the end surface 12 of the outlet side where a temperature is easily changed over time can be reinforced favorably if the sealed honeycomb structure 100 is used as a filter such as a DPF. Therefore, breakage due to thermal impact may be effectively prevented. In addition, since volume is not reduced by deposition of the ash, the sealed honeycomb structure 100 according to the present exemplary embodiment may improve strength of the honeycomb structure 4 without influence on the increase of the pressure loss, cleaning period of the ash, and replacement period of a filter of purifying the exhaust gas (for example, DPF) after the ash is deposited.

The "reinforcing part" means a part disposed at the corner portion at which the walls dividedly forming the cells cross each other and reinforcing strength (durability) of the walls that are frame parts of the honeycomb structure. For example, the "reinforcing part" includes separate members additionally mounted at the corner portion where the walls cross in order to reinforce the corner portion. The member for forming the reinforcing part may be, for example, reinforcing member such as concave parts or beams. The reinforcing part may be formed by mounting the reinforcing member at the corner portion of the reinforced cell. In addition, the reinforcing part may be formed by dipping an end portion of the outlet side of the sealed honeycomb structure into slurry including material forming the reinforcing part and attaching the slurry to the corner portion of the reinforced cell. The reinforcing part for forming the corner portion of the reinforced cell to be R shape or C shape may be formed by drying or burning the slurry.

The "reinforced cell" is a cell where at least one corner portion among the corner portions formed at an external circumference of the cell is reinforced by the "reinforcing part". That is, the "reinforced cell" may include a reinforced corner portion at which the reinforcing part is formed and a non-reinforced corner portion at which the reinforcing part is not formed. In addition, the "reinforced cell" may be the cell, all the corner portions of which are reinforced by the reinforcing parts at the end surface of the outlet side of the honeycomb structure (i.e., all the corner portions of the reinforced cell are the reinforced corner portions at the end surface of the outlet side).

For example, the reinforced cell having the reinforced corner portion and the non-reinforced corner portion may suppress reduction in the volume of the outlet cell and may further suppress the increase of the pressure loss. Meanwhile, the reinforced cell, all the corner portions of which are the reinforced corner portions may improve durability of the sealed honeycomb structure favorably. If a virtual line is drawn from a mass center of the honeycomb structure (a mass center of the cross-section vertical to the extending direction of the cell) to a vertex of the corner portion of the cell and the virtual line is elongated radially toward an external circumference of the honeycomb structure, "the corner portions, two sides of which are disposed across the virtual line", are formed to be the reinforced corner portions, and the other corner portions (that is, the corner portion, two sides of which are not disposed across the virtual line are formed to be the non-reinforced corner portions in a case that the reinforced cells, for example, has the reinforced corner portion and the non-reinforced corner portion.

Figure 6:
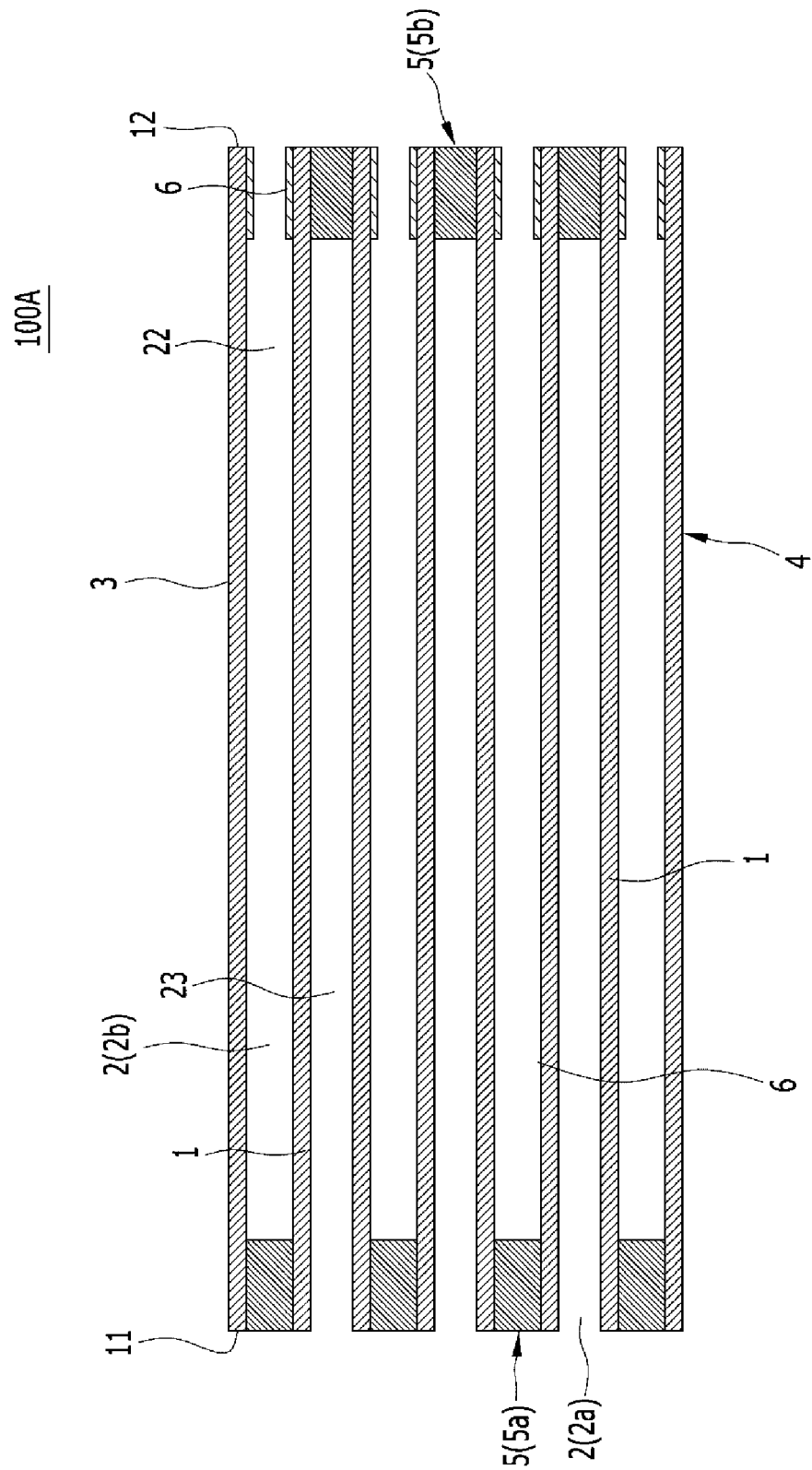
FIG. 6 is a schematic diagram of a cross-section parallel to an extending direction of a cell in a sealed honeycomb structure according to another exemplary embodiment of the present invention.

A length of the reinforcing part in the extending direction of the cell is not limited if the reinforcing part of the reinforced cell is formed at the section of the honeycomb structure from the end surface of the outlet side in the extending direction of the cell. The length of the reinforcing part in the extending direction of the cell (hereinafter, it will be called a "length of the reinforcing part") may be larger than or equal to a length of the outlet side sealing portion in the extending direction of the cell (hereinafter, it will be called a "sealing length" or a "sealing depth"). Thereby, durability at the end surface of the outlet side in the honeycomb structure may be improved favorably. That is, durability may be improved favorably by adjusting the length of the reinforcing part to be larger than or equal to the of the sealing depth of the sealing portion. For example, the length of the reinforcing part 6 is the same as the sealing length of the outlet side sealing portion 5b according to the sealed honeycomb structure 100A shown in FIG. 6. Durability of the sealed honeycomb structure 100A, compared with the sealed honeycomb structure where the reinforcing part is formed at an entire length of the honeycomb structure 4, may be deteriorated a little but may be greatly improved, compared with the sealed honeycomb structure where the reinforcing part is not formed. Herein, FIG. 6 is a schematic diagram of a cross-section parallel to an extending direction of a cell in a sealed honeycomb structure according to another exemplary embodiment of the present invention. In addition, constituent elements of the sealed honeycomb structure 100A shown in the FIG. 6, which are the same as those of the sealed honeycomb structure 100 shown in FIG. 5, will be described by denoting the same reference numerals thereto.

In addition, the reinforcing part of the reinforced cell may be formed on the section corresponding to a range smaller than or equal to ⅓ of the length of the honeycomb structure in the extending direction of the cell from the end surface of the outlet side of the honeycomb structure. That is, the reinforcing part for reinforcing the corner portion is not formed on a section corresponding to a range smaller than ⅔ of the length of the honeycomb structure from the end surface of the inlet side in the reinforced cell. Therefore, durability may be improved, volume of the outlet cells including the reinforced cells may increase, and increase of pressure loss may be effectively suppressed. In addition, the length of the reinforcing part of the reinforced cell in the extending direction of the cell (hereinafter, it will be simply called a "length of the reinforcing part") may be larger than or equal to that of the sealing portion. The length of the reinforcing part from the end surface of the outlet side of the honeycomb structure may preferably be larger than or equal to the sealing length and be smaller than or equal to about $1/3.5$ of the length of the honeycomb structure, and may further preferably be larger than or equal to the sealing length and be smaller than or equal to about $1/4$ of the length of the honeycomb structure.

According to the sealed honeycomb structure 100 of the present exemplary embodiment, a shape of the honeycomb structure 4 is not limited but may be a cylindrical shape, a tubular shape having an oval end surface, and a polygon pillar shape having a polygon end surface such as "square, rectangle, triangle, pentagon, hexagon, octagon, and so on". The honeycomb structure 4 having the cylindrical shape is exemplarily shown in FIG. 1 to FIG. 5. In addition, the honeycomb structure 4 shown in FIG. 1 to FIG. 5 has an external wall 3, but the honeycomb structure 4 may not have the external wall 3. It is preferable that the external wall 3 is formed together with the walls when a molded article of the honeycomb is extruded in manufacturing process of the honeycomb structure. In addition, the external wall 3 may be formed by spaying ceramic material to the external circumference of the honeycomb structure.

The honeycomb structure used in the sealed honeycomb structure according to the present exemplary embodiment, as shown in FIG. 6, may include a plurality of honeycomb segments 8 provided with the porous walls 1 dividedly forming the plurality of cells 2 being the fluid channels extending from the end surface 11 of the inlet side to the end surface 12 of the outlet side, and fences 7 arranged to enclose the walls 1. That is, the honeycomb structure 4a may be formed by bonding the plurality of honeycomb segments 8 in a state that side surfaces of the plurality of honeycomb segments 8 are contactedly disposed.

Figure 7:
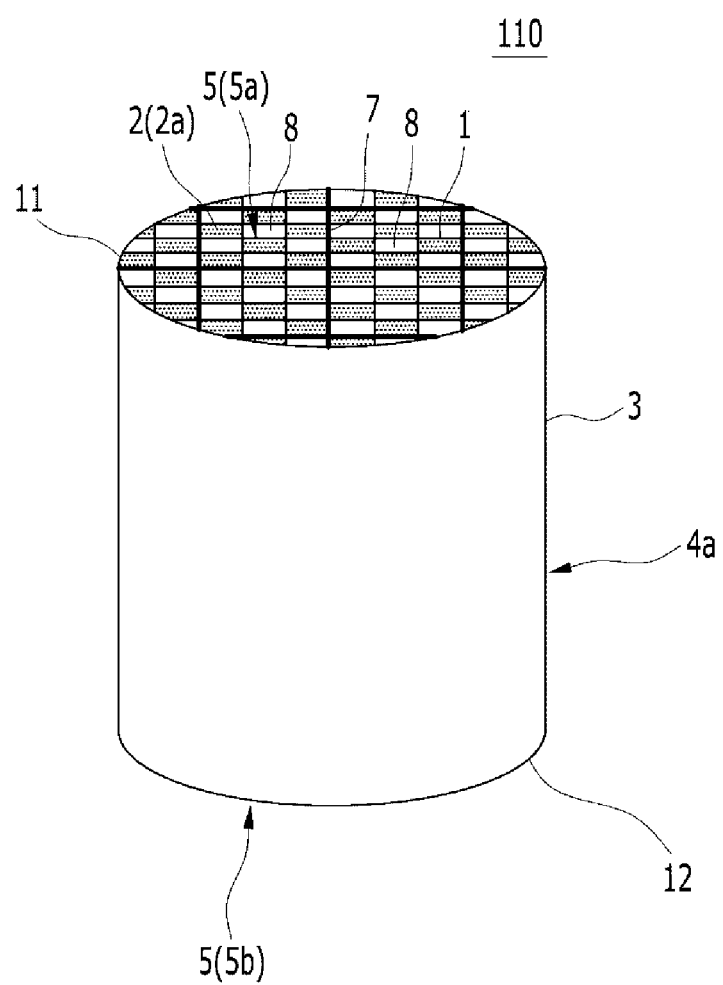
FIG. 7 is a perspective view of a sealed honeycomb structure according to another exemplary embodiment of the present invention.

The sealed honeycomb structure 110 shown in FIG. 7 includes the outlet side sealing portion 5b that is mounted at the openings of the predetermined cells in the end surface 12 of the outlet side of each honeycomb segment 8 and forms the inlet cells 2a where the end surface 11 of the inlet side is open and the end surface 12 of the outlet side is sealed, and the inlet side sealing portion 5a that is mounted at the openings of the remaining cells in the end surface 11 of the inlet side of each honeycomb segment 8 and forms the outlet cells where the end surface 12 of the outlet side is open and the end surface 11 of the inlet side is sealed. Herein, FIG. 7 is a perspective view of a sealed honeycomb structure according to another exemplary embodiment of the present invention.

Effects of the sealed honeycomb structure 110 by using the honeycomb structure 4a of segment type shown in FIG. 7 are the same as those of the sealed honeycomb structure 100 by using the honeycomb structure 4 of integrated type shown in FIG. 1 to FIG. 5. That is, at least one cell among the outlet cells 2b may be the reinforced cell where the reinforcing part 6 for reinforcing the outlet cell 2b is formed at at least one corner portion 21a at which the walls 1 cross, and the inlet cells 2a may be the non-reinforced cells where none of the reinforcing parts is formed at all the corner portions 21 at which the walls 1 cross (please refer to FIG. 4) in the sealed honeycomb structure 110 shown in FIG. 6. Therefore, the same effects as those of the sealed honeycomb structure 100 shown in FIG. 1 to FIG. 5 can be achieved by the sealed honeycomb structure 110 shown in FIG. 7. In addition, the reinforcing part of the reinforced cell is formed at the section of the honeycomb structure in the extending direction of the cell from the end surface of the outlet side of the honeycomb structure (not shown) according to the sealed honeycomb structure 110 shown in FIG. 7.

In a case that the honeycomb structure of the segment type is used, at least one of the outlet cells of the honeycomb segments 8 may be the reinforced cell, or all the outlet cells of the honeycomb segments 8 may be the reinforced cells. It is exemplified in FIG. 7 that all the outlet cells of the honeycomb segments 8 are the reinforced cells.

In addition, the reinforcing parts of the sealed honeycomb structure 110 shown in FIG. 7 are the same as those 6 of the sealed honeycomb structure 100 shown in FIG. 1 to FIG. 5.

In addition, all the inlet cells 2a are the non-reinforced cells 23 in the above description, but the reinforcing part for reinforcing the inlet cell 2a may be formed at at least one corner portion 21 of the inlet cell 2a at which the walls 1 on the cross-section vertical to the extending direction of the cell 2 cross each other. In this case, the number of the corner portions reinforcing the inlet cell 2a may be smaller than the number of the corner portions reinforcing the outlet cell 2b. In addition, the reinforcing part of the inlet cell 2a is formed at the section of the honeycomb structure in the extending direction of the cell from the end surface of the inlet side of the honeycomb structure 100. Effects of this exemplary embodiment are almost the same as those of the exemplary embodiments where all the inlet cells 2a are the non-reinforced cells 23.

The "inlet cell" is the cell where the outlet side sealing portion is mounted at the opening of the cell formed on the end surface of the outlet side. The fluid such as the exhaust gas is flowed into the opening of the inlet cell formed on the end surface of the inlet side. Meanwhile, the "outlet cell" is the cell where the inlet side sealing portion is mounted at the opening of the cell formed on the end surface of the inlet side. The fluid such as the exhaust gas cannot be directly flowed into the outlet cell. The fluid flows into the outlet cell after the fluid flowing into the inlet cell passes through the walls, and is exhausted from the opening of the outlet cell formed on the end surface of the outlet side. When the fluid moves from the inlet cell to the outlet cell, the particulate matter in the fluid is trapped by the porous wall.

Arrangement of the inlet cell and the outlet cell, i.e., the arrangement of the outlet side sealing portion and the inlet side sealing portion is not specifically restricted. For example, the inlet cell and the outlet cell may be disposed alternately across the wall. In addition, some of the inlet cells or some of the outlet cells are gathered and disposed at any region on the end surface of the honeycomb structure. For trapping the particulate matter in the fluid favorably by the walls, it is preferable that the inlet cell and the outlet cell are disposed alternately across the wall.

A shape of the cell (the opening shape on the cross-section vertical to the extending direction of the cell) is not specifically restricted. For example, the shape of the cell may be a polygon shape such as triangle, quadrangle, hexagon, octagon, and so on. Further, the shape of the cell where the reinforcing part is formed means a shape of the cell without the reinforcing part. In addition, the cross-sectional opening shape of the inlet cell vertical to the extending direction of the cell (hereinafter, it will be simply called "opening shape of inlet cell") may be the same as or different from that of the outlet cell without the reinforcing part vertical to the extending direction of the cell (hereinafter, it will be simply called "opening shape of outlet cell") according to the sealed honeycomb structure of the present exemplary embodiment.

In a case that the opening shape of the inlet cell is the same as that of the outlet cell, the opening shape may be quadrangle, hexagon, octagon, and so on.

Further, cross-sectional thickness of the wall constituting the honeycomb structure vertical to the extending direction of the cell (hereinafter, it is simply called "thickness of the wall") is basically uniform according to the sealed honeycomb structure of the present exemplary embodiment. The "basically uniform" means that the thickness of the wall is uniform except a case that the thickness of the wall is slightly irregular due to a deformation occurring when forming the sealed honeycomb structure. That is, the cross-sectional thickness of the wall is not changed intentionally, and is substantially uniform according to the sealed honeycomb structure of the present exemplary embodiment. For example, if slits of the mold for extruding the honeycomb structure are manufactured by a slicer, the uniform thickness of the wall is achieved. In addition, if the thickness of a portion (particularly, corner portion) of the wall is thicker than that of the other portion of the wall, it is regarded that the reinforcing part is formed at the portion according to the sealed honeycomb structure of the present exemplary embodiment.

The thickness of the wall may be 127 to 508 µm, may preferably be 152 to 483 µm, and may further preferably be 152 to 445 µm. If the thickness of the wall is thinner than 127 µm, strength of the sealed honeycomb structure may be deteriorated. If the thickness of the wall is thicker than 508 µm, initial pressure loss of the sealed honeycomb structure may increase.

Porosity of the wall may be 25 to 75%, may preferably be 30 to 65%, and may further preferably be 35 to 65%. If the porosity is lower than 25%, the initial pressure loss of the sealed honeycomb structure may increase. If the porosity is higher than 75%, the strength of the sealed honeycomb structure may be deteriorated. The porosity is detected by a mercury porosimeter.

Average diameter of the pore of the wall may be 6 to 35 µm, may preferably be 7 to 30 µm, and may further preferably be 7 to 25 µm. If the average diameter of the pore is smaller than 6 µm, the initial pressure loss of the sealed honeycomb structure may increase. If the average diameter of the pore is larger than 35 µm, the strength of the sealed honeycomb structure may be deteriorated. The average diameter of the pore is detected by the mercury porosimeter.

Cell density of the honeycomb structure is not limited, but may be 15 to 80/cm$^2$ and may preferably be 15 to 62/cm$^2$. If the cell density is lower than 15/cm$^2$, the strength of the sealed honeycomb structure may be deteriorated. If the cell density is higher than 80/cm$^2$, the cross-sectional area of the cell (area of the cross-section vertical to the extending direction of the cell) decreases, and thereby the pressure loss may increase.

Material of the wall may be selected from the group consisting of ceramic, cordierite, silicon carbide, silicon-silicon carbide family composite material, mullite, alumina, aluminum titanate, silicon nitride, silicon carbide-cordierite family composite material, and combinations thereof having superior strength and thermal resistance. The cordierite among them is preferable.

Material of the reinforcing part is not limited. Ceramic and preferably the above-mentioned material for the wall may be used as the material of the reinforcing part. According to sealed honeycomb structure of the present exemplary embodiment, it is preferable that thermal expansion coefficient of the wall is the same value as or similar value to that of the reinforcing part. In addition, the material of the wall may be the same as that of the reinforcing part. Thereby, even though thermal stress is applied to the sealed honeycomb structure, separation of the reinforcing part from the honeycomb structure or breakage of a bonding portion of the reinforcing part and the wall may be prevented. In addition, even though the material of the wall is the same as that of the reinforcing part, the material of the reinforcing part (the same material as the wall) may have low porosity so as to increase thermal capacity and thermal conductivity. Therefore, the reinforcing part may become dense and strong, and thus SML may be improved favorably.

Figure 8:
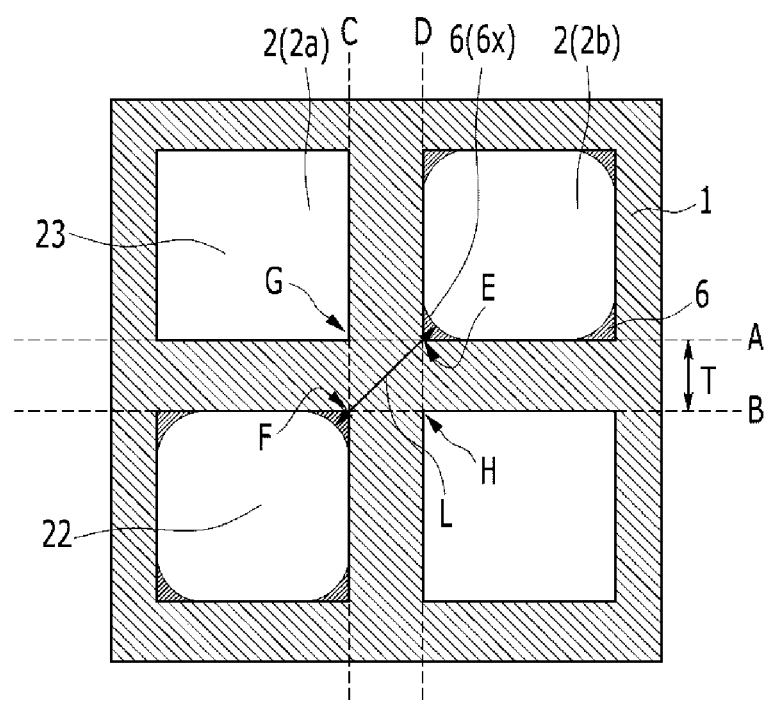
FIG. 8 is a schematic diagram of an enlarged cross-section vertical to an extending direction of a cell in a sealed honeycomb structure according to an exemplary embodiment of the present invention.

Size of the reinforcing part may not be limited. The reinforcing part, however, has such a size that the reinforcing part can be mounted at at least one corner portion of the walls dividedly forming the outlet cells and does not block the opening portion of the outlet cell completely. If a considerable portion of the opening portion of the outlet cell is blocked by the reinforcing part, the pressure loss may increase. As shown in FIG. 8, a ratio (L/T) of "an intersecting distance L of an intersecting part of the walls that is a distance from a surface of the reinforcing part 6 of the reinforced cell 22 (outlet cell 2b) to a surface of another cell (the reinforced cell 22 that is disposed in a diagonal direction in FIG. 8) disposed across an intersecting point of the walls 1 dividedly forming the reinforced cells 22" to an "average thickness T of the wall 1 except the reinforcing part 6 (hereinafter, it will be called "average thickness T of the wall 1")" may be 1.5 to 9.3 according to the sealed honeycomb structure of the present exemplary embodiment. Thereby, increase of the pressure loss may be suppressed and durability may be improved. FIG. 8 is a schematic diagram of an enlarged cross-section vertical to an extending direction of a cell in a sealed honeycomb structure according to an exemplary embodiment of the present invention.

Herein, the ratio (L/T) of "the intersecting distance L of the intersecting part of the walls (hereinafter, it will be called the "intersecting distance L of the intersecting part of the walls") that is the distance from the surface of the reinforcing part 6 of the reinforced cell 22 to the surface of another cell disposed across the intersecting point of the walls 1 dividedly forming the reinforced cells 22" to the "average thickness T of the wall 1 except the reinforcing part 6 (hereinafter, it will be called the "average thickness T of the wall 1")" will be described. As shown in FIG. 8, if parallel lines A, B, C and D are drawn along the walls 1 where the reinforcing part 6 is not formed, an average of a distance between A and B and a distance between C and D is called the "average thickness T of the wall 1". In addition, intersection points of the parallel line A, B, C and D are called E, F, G and H, respectively. Hereinafter, a length between two intersecting points of two cells with a line passing through the intersection point E closest to the reinforcing part 6x and the intersection point F closest to another cell (another cell is also the reinforced cell 22 in FIG. 8) disposed across the intersecting point of the wall 1 will be defined as the "intersecting distance L of the intersecting part of the walls". If the "intersecting distance L of the intersecting part of the walls" detected by the above-described method is divided by the "average thickness T of the wall 1", the "ratio (L/T)" is calculated.

It is illustrated in FIG. 8 that both of the reinforced cell 22 having the reinforcing part 6x and another cell disposed across the intersecting point of the wall 1 are the reinforced cells 22. However, cases where another cell disposed across the intersecting point of the wall 1 is the non-reinforced cell 23 or the reinforced cell 22 having no reinforcing part at the corner portion of the wall according to, for example, the position of the reinforcing part 6x may exist. In such cases, the "ratio (L/T)" can be calculated by the above-described method.

If the ratio (L/T) of the "intersecting distance L of the intersecting part of the walls" to the "average thickness T of the wall 1" is smaller than 1.5, improvement of the durability due to the reinforcing parts may not be sufficiently secured. Meanwhile, if the ratio (L/T) of the "intersecting distance L of the intersecting part of the walls" to the "average thickness T of the wall 1" is larger than 9.3, the opening area of the reinforced cell 22 may be excessively reduced, and thereby the pressure loss may increase excessively. In addition, even though the ratio (L/T) is greater than 9.3, the durability may not improve further and increase ratio of the pressure loss may be great. Meanwhile, the ratio (L/T) may preferably be 1.5 to 8.0 and may further preferably be 1.5 to 7.0.

Furthermore, the non-reinforced cell may be a cell where the reinforcing part is not formed at the corner portion at which the walls cross according to the honeycomb structure of the present exemplary embodiment. However, even though the reinforcing part is not formed in the non-reinforced cell intentionally, the corner portion where the reinforcing part is not formed may be formed to be slightly thicker than the other portions due to abrasion of the mold for extruding the honeycomb structure. Therefore, if the ratio (L/T) is smaller than 1.5, it is to be understood that the reinforcing part is not formed at the corner portion according to the honeycomb structure of the present exemplary embodiment. Furthermore, if the reinforcing part is not formed at the corner portion and the corner portion is not slightly thicker than the other portions in a state that the shape of the opening portion of the cell is square, for example, the ratio (L/T) is about 1.41.

In addition, a cross-sectional area of each reinforcing part (one reinforcing part) may occupy 0.05 to 20% of a cross-sectional area of the opening portion without the reinforcing part vertical to the extending direction of the cell. If the cross-sectional area of the reinforcing part is smaller than 0.05% of the cross-sectional area of the opening portion, reinforcing effects of the reinforcing part cannot be sufficiently secured. In addition, if the cross-sectional area of the reinforcing part is larger than 20% of the cross-sectional area of the opening portion, for example, the reinforcing parts are formed at four corner portions of a quadrangular cell, the opening area of the reinforced cell is very small and the pressure loss of the sealed honeycomb structure may increase. Meanwhile, the cross-sectional area of each reinforcing part may preferably occupy 0.1 to 12% and may further preferably 0.4 to 5% of the cross-sectional area of the opening portion without the reinforcing part vertical to the extending direction of the cell.

The reinforcing part described above is formed at at least one cell among the outlet cells, and more particularly, at least one corner portion of the cell. For example, a ratio of a total area of the reinforcing parts (summation of all the area of the reinforcement parts) to a total opening area (summation of all the opening area) of the outlet cells may be 0.1 to 22%, may preferably be 0.1 to 15%, and may further preferably be 0.1 to 11%. Furthermore, the "total opening area of the outlet cells" means the summation of the opening areas of all the outlet cells regardless that the outlet cells are the reinforced cell or the non-reinforced cell, and the "total area of the reinforcing parts" means the summation of the occupying area of all the reinforcing parts formed in the sealed honeycomb structure of the present exemplary embodiment.

Figure 9:
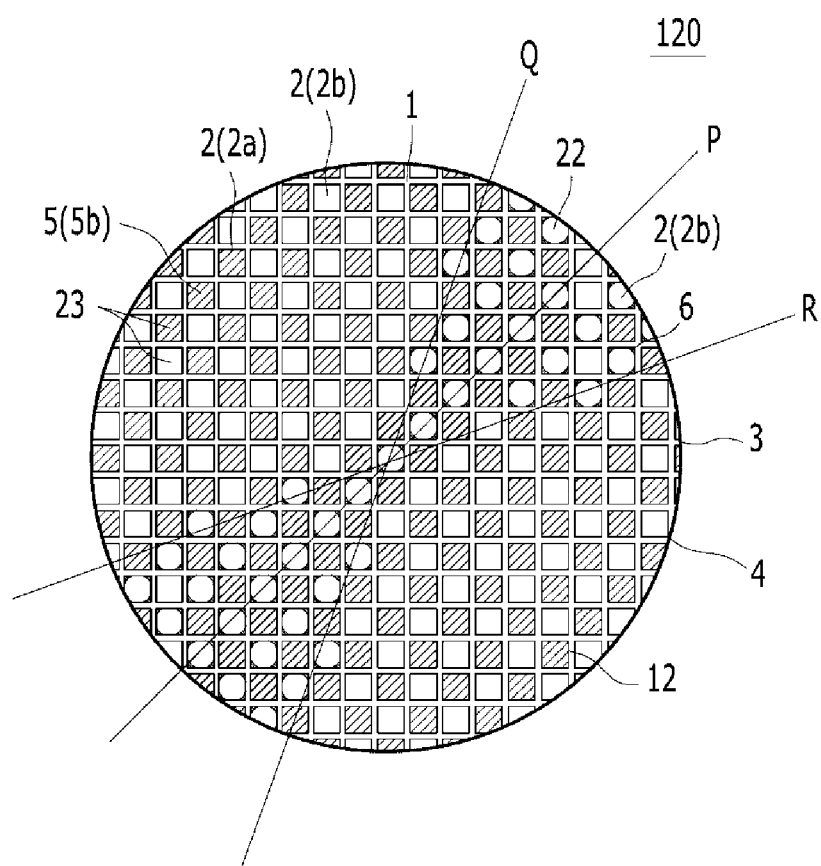
FIG. 9 is a schematic diagram of an end surface of an outlet side in a sealed honeycomb structure according to other exemplary embodiment of the present invention.

In addition, it is preferable that the cross-sectional shape of the cell 2 is square and the outlet cells 2b within a narrow angle range such as 10 to 60° (for example, between a line Q and a line R in FIG. 9) with respect to a diagonal P (more particularly, extending line of the diagonal) of the cell perpendicular to the exterior circumference of the honeycomb structure are the reinforced cells 22 (that is, the sealed honeycomb structure 120 exemplarily shown in FIG. 9). Thereby, the durability of the sealed honeycomb structure 120 may be improved favorably. FIG. 9 is a schematic diagram of an end surface of an outlet side in a sealed honeycomb structure according to other exemplary embodiment of the present invention. In addition, constituent elements of the sealed honeycomb structure 120 shown in the FIG. 9, which are the same as those of the sealed honeycomb structure 100 shown in FIG. 1 to FIG. 5, will be described by denoting the same reference numerals thereto.

Manufacturing Method of Sealed Honeycomb Structure

A manufacturing method of the sealed honeycomb structure according to the present exemplary embodiment will be described. A body for manufacturing the honeycomb structure is blended and is formed to manufacture the molded article of the honeycomb (forming process). When manufacturing the sealed honeycomb structure of the present exemplary embodiment, the reinforcing parts may be formed in any one of the molded article of honeycomb, a honeycomb dried article obtained by drying the molded article of honeycomb or the honeycomb structure obtained by burning the honeycomb dried article after the molded article of the honeycomb is obtained. In addition, it is preferable that the reinforcing part is formed in the molded article of the honeycomb or the honeycomb dried article. Since the reinforcing part is formed in the molded article of the honeycomb or the honeycomb dried article, a boundary between the reinforcing part and the wall is not formed well and thus the reinforcing part is hard to be separated from the wall. In addition, if the reinforcing part if formed in the molded article of the honeycomb, additional drying process may not be needed. Therefore, it is very cost-effective.

In addition, it is preferable that the end surface of the inlet side and the end surface of the outlet side in the sealed honeycomb structure are determined when manufacturing the molded article of the honeycomb. Since shapes of the cells at the end surface of the inlet side and the end surface of the outlet side (that is, the inlet cells and the outlet cells) differ from each other (i.e., whether the reinforcing parts exist or not) according to the sealed honeycomb structure of the present exemplary embodiment, directivity of the molded article of the honeycomb having the pillar shape is preferably predetermined.

After that, the obtained molded article of the honeycomb (or the honeycomb dried article that is dried by demands) is burnt to manufacture the honeycomb structure (manufacturing process of the honeycomb structure). If the reinforcing parts are not formed in the forming process, the reinforcing parts are formed at a at least part of the cells which will be the outlet cells or the outlet cells and the inlet cells before or after burning.

After that, the openings of the predetermined cells at the end surface of the inlet side and the openings of the remaining cells at the end surface of the outlet side in the molded article of the honeycomb are sealed so as to form the inlet side sealing portion and the outlet side sealing portion (sealing process). Thereby, the sealed honeycomb structure of the present exemplar embodiment can be manufactured. Hereinafter, each process will be described in further detail.

After that, the reinforcing parts are formed on the section in the extending direction of the cell from the end surface of the outlet side or the end surface of the inlet side in the corner portion of at least one cell among the cells (i.e., outlet cells) where the inlet side sealing portion is formed at the end surface of the inlet side, or some corner portions of the cells which will be the outlet cells and the inlet cells (manufacturing process of the reinforcing parts). Thereby, the sealed honeycomb structure of the present exemplar embodiment can be manufactured. In addition, the reinforcing parts may be formed before the molded article of the honeycomb is burnt or before the sealing portion is formed, as described above. Hereinafter, each process will be described in further detail.

Forming Process

The molded article of honeycomb having the plurality of cells that will be fluid channels is dividedly formed by forming ceramic mold material containing ceramic material in the forming process.

The ceramic material contained in the ceramic mold material may be selected from the group consisting of cordierite material, cordierite, mullite, alumina, titania, carbonization silicon and aluminum titanate, may preferably be selected from the group consisting of cordierite material, cordierite, mullite, alumina, titania, carbonization silicon and aluminum titanate, and may further preferably be selected from the group consisting of cordierite material, cordierite, mullite, alumina, titania, carbonization silicon and aluminum titanate. In addition, the cordierite material means the ceramic material, chemical composition of which includes silica of 42 to 56 mass %, alumina of 30 to 45 mass %, and magnesia of 12 to 16 mass %. The cordierite material is burnt to become cordierite.

Further, the ceramic mold material may be made by compounding the ceramic material with dispersion medium, organic binder, inorganic binder, pore-forming material, and surfactant and so on. Composition ratio of each material is not limited and may be set according to structure and material of the honeycomb structure.

When forming the ceramic mold material, forming material is kneaded to obtain the body and the obtained body is molded into a honeycomb shape. A method of obtaining the body by kneading the forming material is not limited, and, for example, a kneader or a vacuum deairing pugmill may be used to obtain the body. A method of forming the molded article of the honeycomb by molding the body is not limited, and conventional forming methods such as extrusion molding or injection molding may be used. For example, the molded article of the honeycomb may be extruded by using the mold having a target cell shape, a target wall thickness, and a target cell density. Hard metal that is hard to be worn out is preferably used as material of the mold.

The shape of the molded article of the honeycomb is not limited, but may be a cylindrical shape (circular cylindrical shape) or a pillar shape, a cross-section vertical to a center axis of which is an oval shape, a racetrack shape, and a polygonal shape such as triangle, quadrangle, pentagon, hexagon, octagon, and so on. If the honeycomb structure is formed by boding the plurality of honeycomb segments, the shape of the molded article of the honeycomb may preferably be a pillar shape, a cross-section vertical to the center axis of which is a polygonal shape such as triangle, quadrangle, pentagon, hexagon, octagon, and so on.

In addition, the molded article of the honeycomb obtained in the forming process may be dried. Drying method is not limited, but may be, for example, hot-air drying, microwave drying, dielectric drying, reduced pressure drying, vacuum drying, lyophilization, and so on. Particularly, the dielectric drying, the microwave drying or the hot-air drying may preferably be used solely or in combined fashion.

Manufacturing Process of the Honeycomb Structure

The honeycomb structure may be obtained by burning the molded article of the honeycomb. In addition, the burning of the molded article of the honeycomb may be done after the sealing portions are mounted at the molded article of the honeycomb.

In addition, the molded article of the honeycomb may be calcined before the molded article of the honeycomb is burnt (main burning). The calcination is performed for cleaning. The calcination method is not limited, but it is enough to remove an organic material (organic binder, a dispersing agent, pore-forming material, and so on) adhered to or contained in the molded article during the calcination. Because combustion temperature of the organic binder is about 100 to 300° C. and combustion temperature of the pore-forming material is about 200 to 800° C. in general, the calcinations is performed for 3 to 100 hours at about 200 to 1000° C. under oxidizing atmosphere.

The burning (main burning) of the molded article of the honeycomb is performed so as to sinter the mold material consisting of the calcined molded article. Thereby, the mold material may become dense and predetermined strength may be secured. Burning condition (temperature, time, and atmosphere) may change depending on the mold material, and thus may be selected according to the mold material suitably. For example, if the cordierite material is used, burning temperature may preferably be about 1410 to 1440° C. In addition, burning time means time for which maximum temperature is maintained and may be about 4 to 6 hours.

The reinforcing material of concave type or beam type is mounted at the corner portions of the cells that will be the outlet cells, or at some corner portions of the cells that will be the outlet cells and the inlet cells before or after the burning. Thereby, the reinforcing parts are formed. That is, the manufacturing process of the reinforcing parts can be performed at this time.

Sealing Process

The sealing portions are formed at the openings of the outlet cells at the end surface of the inlet side and the openings of the inlet cells at the end surface of the outlet side by filling sealing material in the openings of the outlet cells at the end surface of the inlet side and the openings of the inlet cells at the end surface of the outlet side in the honeycomb structure.

When filling the sealing material in the honeycomb structure, the sealing material is firstly filled in an end portion of one side. After that, the sealing material is filled in an end portion of the other side. One exemplary method of filling the sealing material in the end portion of the one side includes making process where a sheet is attached to the end surface of the one side (for example, the end surface of the inlet side) of the honeycomb structure and holes are bored at positions of the sheet overlapping the "cells where the sealing portions are formed", and press-fit process where "the end portion of the honeycomb structure where the sheet is attached" is pressed in the container in which the sealing material is stored such that the sealing material is press-fitted into the cells of the honeycomb structure. When the sealing material is press-fitted into the cells of the honeycomb structure, the sealing material passes through the holes formed in the sheet and is filled in only the cells communicating with the holes formed in the sheet.

In addition, a method of filling the sealing material in the end portion of the other side (for example, the end surface of the outlet side) of the honeycomb structure may be the same as the method of filling the sealing material in the end portion of the one side of the honeycomb structure. In addition, the sealing material may be simultaneously filled in the both end portions of the honeycomb structure.

After that, the sealing material filled in the honeycomb structure is dried to form the sealing portions, and thereby the sealed honeycomb structure may be obtained. In addition, after the sealing material is filled in the both end portions of the honeycomb structure, the sealing material may be dried, or after the sealing material filled in the end portion of one side of the honeycomb structure is dried, the sealing material is filled in the end portion of the other side and then is dried. Further, the sealing material may be burnt in order to fix the sealing material strongly. In addition, the sealing material may be filled in the molded article of the honeycomb before or after dried, and the sealing material together with the molded article of the honeycomb before or after dried may be burnt.

Manufacturing Process of the Reinforcing Parts:

After that, the reinforcing parts are formed on the section in the extending direction of the cell from the end surface of the outlet side or the end surface of the inlet side in the corner portion of at least one cell among the outlet cells or among the outlet cells and the inlet cells of the honeycomb structure where the sealing portion is formed. In further detail, material for forming the reinforcing part is selected and slurry for the reinforcing part is prepared. After that, the honeycomb structure is dipped into the slurry from the end surface of the outlet side. A dipping depth may be the length of the reinforcing part. The slurry for the reinforcing part is attached to the corner portion of the outlet cell by dipping the honeycomb structure from the end surface of the outlet side. After the honeycomb structure is drawn out from the slurry for the reinforcing part, the slurry for the reinforcing part is dried and, if necessary, is burnt. Thereby, the reinforcing part can be formed at the corner portion of the outlet cell.

A method for forming the reinforcing part by using the slurry for the reinforcing part will be described with illustration of forming the reinforcing part at the corner portion of the outlet cell. The reinforcing parts may be formed by dipping method. According to the dipping method, the sealed honeycomb structure before or after the burning is dipped from the end surface of the outlet side into the reinforcing material of slurry type contained in any container. In addition, the reinforcing parts may be formed by sucking method. According to the sucking method, the reinforcing material is sucked from the end surface of the inlet side of the sealed honeycomb structure in a state that the end surface of the outlet side of the sealed honeycomb structure is contacted with the reinforcing material of slurry type. Further, the reinforcing parts may be formed by injection method. According to the injection method, the reinforcing material of slurry type is injected into the end surface of the outlet side of the sealed honeycomb structure. At this time, a particle diameter of the reinforcing material may be larger than the average pore diameter of the walls of the honeycomb structure to prevent impregnation of the reinforcing material into the inlet cells. In addition, forming the reinforcing parts at the corner portions of the outlet cells and the inlet cells is similar to the forming the reinforcing parts at the corner portions of the outlet cells. Further, thermal expansion coefficient of the reinforcing material may be the same as that of the sealed honeycomb structure to prevent breakage of the reinforcing material or the honeycomb structure in actual applications.

In addition, in a case that the reinforcing parts are selectively formed at specific outlet cells among the outlet cells, masking process where a sheet is attached to the end surface of the outlet side of the honeycomb structure and holes are bored at positions of the sheet overlapping the "outlet cells where the reinforcing parts are formed" in the same fashion as the formation of the sealing portion.

In addition, a method of forming the reinforcing part is not limited to the above-described methods. For example, a reinforcing member, a part of an external circumference of which can be fitted into the corner portion of the outlet cell is separately manufactured, and the reinforcing member is attached to the corner portion of the outlet cell. Thereby, the reinforcing part can be formed. The reinforcing member may be a rod member defining the length of the reinforcing part or a beam member putting on two sides forming the corner portion. The rod member may have concave shape where a side facing the central axis of the cell is pitted toward the corner portion when disposing the rod member at the corner portion of the outlet cell.

Thereby, the sealed honeycomb structure of the present exemplary embodiment can be manufactured. However, a method of manufacturing the sealed honeycomb structure of the present exemplary embodiment is not limited to the above-described method.

Hereinafter, the sealed honeycomb structure of the present invention will be described in detail with reference to the Examples, but it is to be understood that the present invention is not limited to the Examples.

EXAMPLE 1

Cordierite material (alumina, talc, and kaolin) is used as the ceramic material. Mass ratio of alumina, talc, and kaolin is a mass ratio obtained after burning. Ceramic mold material is obtained by mixing the ceramic material with the binder (methylcellulose) and water. The obtained ceramic mold material is kneaded by using the kneader so as to obtain the body.

After that, the molded article of the honeycomb is formed by molding the body by means of a vacuum extruder. Wall thickness is 0.305 mm, cell density is 46.5 cell/cm2, and cell pitch is 1.47 mm in the honeycomb structure obtained by burning the molded article of the honeycomb. In addition, entire shape of the molded article of the honeycomb is cylindrical (diameter of the end surface is 143.8 mm, and a length in the extending direction of the cell is 152.4 mm). The entire shape of the molded article of the honeycomb is integrally formed (monolithic structure), and this honeycomb structure is represented by a "monolith" in "structure of honeycomb structure" column of Table 1.

After that, masking is performed to some of the cell openings at the end surface (end surfaces of the inlet side and the outlet side) of the molded article of the honeycomb. At this time, the cells where masking is performed and the cells where the masking is not performed are disposed alternately. In addition, the end portion where masking is performed is dipped into the sealing slurry containing cordierite material such that the sealing slurry is filled in the openings of the cells where masking is not performed. Therefore, the sealed molded article of the honeycomb where the sealing portions are formed at the openings of the outlet cells at the end surface of the inlet side and at the openings of the inlet cells at the end surface of the outlet side is obtained.

After that, the reinforcing part is formed at the corner portion of the outlet cell. In more detail, reinforcing material of slurry type is prepared by using the ceramic mold material (cordierite material) used to manufacture the molded article of the honeycomb. In addition, water amount in the reinforcing material is larger than that in the ceramic mold material used to manufacture the molded article of the honeycomb. After that, the reinforcing material is filled in a container, and the sealed molded article of the honeycomb is dipped into the reinforcing material from the end surface of the outlet side. Thereby, the reinforcing part is formed.

The reinforcing parts are formed at all the corner portions (four corners of the rectangular cell) of the all the outlet cells. The "length of the reinforcing part from the end surface of the outlet side" is 2 mm in Example 1. That is, the reinforcing part is formed on 2 mm range of the length of the honeycomb structure (152 mm) from the end surface of the outlet side, and the reinforcing part is not formed on the remaining range (150 mm).

After that, the sealed molded article of the honeycomb is heated for 5 hours at 450° C. for performing the cleaning, and is heated for 7 hours at 1425° C. for performing the burning. Thereby, the sealed honeycomb structure is obtained. Each of the "sealing lengths" of the inlet side sealing portion and the outlet side sealing portion is 4 mm.

In the outlet cell where the reinforcing part is formed, the ratio of "the intersecting distance L of the intersecting part of the walls that is the distance from the surface of the reinforcing part of the outlet cell to the surface of another cell disposed across the intersecting point of the walls dividedly forming the outlet cells" to the "average thickness T of the wall except the reinforcing part" (hereinafter, it will be called an "intersection ratio of the outlet cell (L/T)") is 2.0.

Meanwhile, in the inlet cell where the reinforcing part is not formed, the ratio of the "intersecting distance L of the intersecting part of the walls that is the distance from the surface of the inlet cell to the surface of anther cell disposed across the intersecting point of the walls dividedly forming the inlet cells" to the "average thickness T of the wall except the reinforcing part" (hereinafter, it will be called "intersection ratio of the inlet cell (L/T)") is 1.4. The intersection ratio (L/T) is measured by the above-described measuring method explained using FIG. 8.

A "maximum principal stress (MPa)", a "soot mass limit (SML)", an "opening ratio of inlet (%)", a "pressure loss (kPa)", a "filter mass (g)", and a "time for reaching 650° C. (sec)" in the obtained sealed honeycomb structure are detected by following methods. The measured results are shown in Table 2.

Maximum Principal Stress (MPa)

Geometry of the sealed honeycomb structure is constructed by a CAD model and the maximum principal stress of the constructed model is calculated by finite element analysis software (brand name: ANSYS Release 11.0) manufactured by ANSYS INC. (Japan). In this case, geometric parameters of the model are the "thickness of the wall", a "cell density", a "cell pitch", a "diameter of a bottom surface", a "length of the cell in the extending direction", the "intersection ratio of the inlet cell or the outlet cell", a "sealing length", and a "thickness of the external wall", and "Young's modulus", "Poisson's ratio", and "thermal expansion coefficient" of the honeycomb structure detected in advance and temperature distribution occurring in the sealed honeycomb structure that is obtained by combustion test of the soot performed in advance are used in the finite element method. Thereby, the maximum principal stress can be obtained.

Soot Mass Limit (SML)

The sealed honeycomb structure is used as a DPF. Soot accumulation amount is increased so as to perform combustion of the soot, and thereby soot mass limit where crack occurring is detected. Firstly, a non-thermally expandable ceramic mat that is holding material is wrapped on the external circumference of the obtained sealed honeycomb structure, and the sealed honeycomb structure is inserted into a canning body of stainless steel (SUS 409) so as to make a canning structure. After that, combustion gas containing the soot generated by burning the diesel fuel is flowed into one end surface (an end surface including one end surface of a short segment) of the honeycomb structure, and is flowed out from the other end surface so as to deposit the soot in the honeycomb structure. After the honeycomb structure is cooled to a room temperature of 25° C., the combustion gas of 680° C. is flowed into the one end surface of the honeycomb structure and the soot is burnt. When pressure loss of the honeycomb structure is deteriorated, flow amount of the combustion gas is reduced so as to burn the soot quickly. After that, whether crack occurs in the sealed honeycomb structure is detected. This test begins when the soot accumulation amount reaches 4 g per 1 liter (hereinafter, it will be represented by 4 g/l) in the honeycomb structure, and is repetitively performed by increasing the soot accumulation amount by 0.5 (g/l) until it is detected that the crack occurs. Soot amount (g/l) when the crack occurs is represented by the SML. Five honeycomb structures per each example or each comparative example are manufactured. If all the five (N=5) SMLs are greater than or equal to 6 g/L, "pass" is designated. On the contrary, if at least one of the five (N=5) SMLs is smaller than 6 g/L, "failure" is designated.

Opening Ratio of Inlet (%)

A ratio of an area of the inlet cells at an end portion of the inlet side to a cross-sectional area of the sealed honeycomb structure is detected. The area ratio (%) is represented by an opening ratio of an inlet (%).

Pressure Loss (kPa)

The pressure loss of the sealed honeycomb structure is detected by using an "apparatus of detecting pressure loss of a filter" disclosed in Japanese Patent Laid-Open Publication No. 2005-172652. Flow amount of fluid is 10 Nm³/min, and fluid temperature when doing experiments is 25° C.

Filter Mass (g)

A mass of the sealed honeycomb structure of each example is detected. The mass is represented by a filter mass (g).

Time for Reaching 650° C. (sec)

The sealed honeycomb structure is used as the DPF. The combustion gas of 680° C. is flowed into the DPF, and a time necessary for an end portion of the outlet side of the DPF to reach 650° C. is detected. In detail, a non-thermally expandable ceramic mat that is holding material is wrapped on the external circumference of the obtained sealed honeycomb structure, and the sealed honeycomb structure is inserted into a canning body of stainless steel (SUS 409) so as to make a canning structure. In addition, a K-type sheathed thermocouple is mounted at an end portion of the outlet side of the canning structure. After that, the combustion gas of 680° C. generated by combustion of the diesel fuel is flowed into the canning structure, a temperature of the thermocouple that is mounted in advance is monitored, and the time for the temperature of the thermocouple to reach 650° C. (time for reaching 650° C. (sec)) is detected.

TABLE 1

| | Structure of honeycomb structure | | Sealing | Whether reinforcing part exists or not | | Intersection ratio (L/T) of inlet cell | Intersection ratio (L/T) of outlet cell | Length of reinforcing part from end surface of inlet side (inlet cell) (mm) | Length of reinforcing part from end surface of outlet side (outlet cell) (mm) | Thickness of wall (mm) | Cell pitch (mm) |
|---|---|---|---|---|---|---|---|---|---|---|---|
| | structure | length (mm) | length (mm) | Inlet cell | Outlet cell | | | | | | |
| Example1 | monolith | 152 | 4 | Non-exist | Exist | 1.4 | 2.0 | — | 2 | 0.305 | 1.47 |
| Example2 | monolith | 152 | 4 | Non-exist | Exist | 1.4 | 2.0 | — | 4 | 0.305 | 1.47 |
| Example3 | monolith | 152 | 4 | Non-exist | Exist | 1.4 | 2.0 | — | 15 | 0.305 | 1.47 |
| Example4 | monolith | 152 | 4 | Non-exist | Exist | 1.4 | 2.0 | — | 20 | 0.305 | 1.47 |
| Example5 | monolith | 152 | 4 | Non-exist | Exist | 1.4 | 2.0 | — | 50 | 0.305 | 1.47 |
| Example6 | monolith | 152 | 4 | Non-exist | Exist | 1.4 | 2.7 | — | 4 | 0.127 | 1.47 |
| Example7 | monolith | 152 | 4 | Non-exist | Exist | 1.4 | 2.7 | — | 4 | 0.127 | 2.54 |
| Example8 | monolith | 152 | 4 | Non-exist | Exist | 1.4 | 1.7 | — | 4 | 0.508 | 1.47 |
| Example9 | monolith | 152 | 4 | Non-exist | Exist | 1.4 | 1.7 | — | 4 | 0.508 | 2.54 |
| Example10 | segment | 152 | 6 | Non-exist | Exist | 1.4 | 2.0 | — | 6 | 0.305 | 1.47 |
| Example11 | monolith | 152 | 4 | Non-exist | Exist | 1.4 | 1.5 | — | 4 | 0.508 | 2.54 |
| Example12 | monolith | 152 | 4 | Non-exist | Exist | 1.4 | 9.3 | — | 4 | 0.127 | 2.54 |
| Example13 | monolith | 152 | 4 | Non-exist | Exist | 1.4 | 9.4 | — | 4 | 0.127 | 2.54 |
| Example14 | monolith | 152 | 4 | Non-exist | Exist | 1.4 | 1.6 | — | 4 | 0.305 | 1.47 |
| Example15 | monolith | 152 | 4 | Partially exist, 5% of outlet cell | Exist | 2.0 | 2.0 | 2 | 2 | 0.305 | 1.47 |
| Comparative Example1 | monolith | 152 | 4 | Non-exist | Non-exist | 1.4 | 1.4 | — | — | 0.305 | 1.47 |
| Comparative Example2 | monolith | 152 | 4 | Exist | Non-exist | 2.0 | 1.4 | 4 | — | 0.305 | 1.47 |
| Comparative Example3 | monolith | 152 | 4 | Exist | Exist | 2.0 | 2.0 | 152 | 152 | 0.305 | 1.47 |
| Comparative Example4 | segment | 152 | 6 | Non-exist | Non-exist | 1.4 | 1.4 | — | — | 0.305 | 1.47 |
| Comparative Example5 | segment | 152 | 6 | Exist | Non-exist | 2.0 | 1.4 | 6 | — | 0.305 | 1.47 |
| Comparative Example6 | segment | 152 | 6 | Exist | Exist | 2.0 | 2.0 | 152 | 152 | 0.305 | 1.47 |
| Comparative Example7 | monolith | 152 | 4 | Non-exist | Exist | 1.4 | 2.0 | — | 152 | 0.305 | 1.47 |
| Comparative Example8 | segment | 152 | 6 | Non-exist | Exist | 1.4 | 2.0 | — | 152 | 0.305 | 1.47 |

TABLE 2

| | maximum principal stress (Mpa) | soot mass limit (SML) | opening ratio of inlet (%) | pressure loss (kPa) | filter mass (g) | time for reaching 650° C. (sec) |
|---|---|---|---|---|---|---|
| Example1 | 22.8 | Pass | 31.4 | 2.36 | 1290.4 | 78.4 |
| Example2 | 14.9 | Pass | 31.4 | 2.37 | 1290.7 | 78.4 |
| Example3 | 14.1 | | 31.4 | 2.38 | 1292.7 | 78.6 |
| Example4 | 13.6 | | 31.4 | 2.39 | 1293.6 | 78.6 |
| Example5 | 13.5 | | 31.4 | 2.43 | 1299.1 | 79.0 |
| Example6 | 9.6 | | 41.7 | 1.28 | 574.6 | 34.9 |
| Example7 | 7.3 | | 45.1 | 0.93 | 337.9 | 20.5 |
| Example8 | 19.2 | | 21.4 | 5.19 | 1984.5 | 120.6 |
| Example9 | 14.6 | | 32.0 | 2.04 | 1247.0 | 75.8 |
| Example10 | 44.7 | Pass | 31.4 | 2.43 | 1811.5 | 110.1 |
| Example11 | 17.2 | Pass | 32.0 | 2.03 | 1247.0 | 75.8 |
| Example12 | 7.8 | | 45.1 | 2.38 | 337.9 | 20.5 |
| Example13 | 6.9 | | 45.1 | 2.50 | 337.9 | 20.5 |
| Example14 | 15.6 | Pass | 31.4 | 2.36 | 1290.7 | 78.4 |
| Example15 | 22.7 | Pass | 31.3 | 2.36 | 1290.7 | 78.4 |
| Comparative Example1 | 29.2 | Failure | 31.4 | 2.36 | 1290.0 | 78.4 |
| Comparative Example2 | 28.7 | | 31.0 | 2.37 | 1290.7 | 78.4 |

TABLE 2-continued

| | maximum principal stress (Mpa) | soot mass limit (SML) | opening ratio of inlet (%) | pressure loss (kPa) | filter mass (g) | time for reaching 650° C. (sec) |
|---|---|---|---|---|---|---|
| Comparative Example3 | 13.0 | | 31.0 | 2.82 | 1345.3 | 81.8 |
| Comparative Example4 | 89.4 | Failure | 31.4 | 2.42 | 1810.0 | 110.0 |
| Comparative Example5 | 87.8 | | 31.0 | 2.43 | 1811.5 | 110.1 |
| Comparative Example6 | 39.9 | | 31.0 | 2.90 | 1887.6 | 114.7 |
| Comparative Example7 | 13.3 | Pass | 31.4 | 2.58 | 1317.6 | 80.1 |
| Comparative Example8 | 39.9 | Pass | 31.4 | 2.65 | 1848.8 | 112.4 |

EXAMPLES 2 to 9 AND 11 to 15 AND COMPARATIVE EXAMPLES 1 TO 3 AND 7

The sealed honeycomb structure is manufactured by the same method manufacturing Example 1 except that the sealing length of the sealing portion, and the cell where the reinforcing part is formed (whether the reinforcing part exists or not), the length of the reinforcing part, the wall thickness, and the cell pitch in the honeycomb structure are changed as shown in Table 1, and the intersection ratio (L/T) of the inlet cell and the intersection ratio (L/T) of the outlet cell are changed as shown in Table 1. In addition, Example 15 shows that the reinforcing parts are formed at a part of the outlet cells and the inlet cells. The same tests as Example 1 are done on the obtained sealed honeycomb structure. The results are shown in Table 2. In addition, the "soot mass limits (SMLs)" of Examples 1, 2, 10, 11, 14 and 15 and Comparative Examples 1, 4, 7 and 8 are detected.

EXAMPLE 10

Carbonization silicon (SiC) is used as the ceramic material so as to manufacture the honeycomb segment, and the honeycomb structure of segment type is manufactured by bonding sixteenth honeycomb segments. In detail, SiC powder and Si metal power are mixed in a mass ratio of 80:20, and methyl cellulose and hydroxypropoxy methylcellulose as the binder, starch and water-absorbent resin as the pore-forming material, surfactant and water are mixed to the mixture of SiC powder and Si metal power such that the ceramic mold material is obtained. The obtained ceramic mold material is kneaded by using kneader such that the body is obtained.

The molded article of honeycomb is formed by molding the body by means of the vacuum extruder. The wall thickness of the molded article of the honeycomb is 305 μm, the cell density of the molded article of the honeycomb is 46.5 cell/cm2, and the cell pitch of the molded article of the honeycomb is 1.47 mm in the honeycomb structure. In addition, cross-sectional shape vertical to the extending direction of the cell is square, a side of which is 36 mm, and a length in the extending direction of the cell is 152.4 mm in the entire shape of the molded article of the honeycomb.

After that, the sealing portion is formed at the molded article of the honeycomb by the same method as the Example 1. After that, the cleaning is performed on the sealed molded article of the honeycomb, and the burning is performed by burning the sealed molded article of the honeycomb at 1410 to 1440° C. for 15 hours. Thereby, a burnt body of the sealed honeycomb (honeycomb segment) is obtained. The inlet cells and the outlet cells are disposed alternately across the walls in the burnt body of the sealed honeycomb.

After that, 16 burnt bodies of the sealed honeycomb are bonded by glue in a state that the burnt bodies are closely disposed with their sides facing each other. Thereby, a bonded body is formed. At this time, the end surface of the inlet side of the burnt body of the sealed honeycomb and the end surface of the inlet side of another burnt body of the sealed honeycomb are aligned in one direction, and then the burnt bodies of the sealed honeycomb are bonded. A mixture of SiC particle and colloid silica is used as the glue for forming the bonded body.

After that, the reinforcing part is formed at the corner portion of the outlet cell. In more detail, reinforcing material of slurry type is prepared by using the ceramic mold material (carbonization silicon (SiC)) used to manufacture the molded article of the honeycomb. In addition, water amount in the reinforcing material is larger than that in the ceramic mold material used to manufacture the molded article of the honeycomb. After that, the reinforcing material is filled in a container, and the sealed molded article of the honeycomb is dipped into the reinforcing material from the end surface of the outlet side. Thereby, the reinforcing part is formed.

After that, the bonded body is grinded such that external configuration of the bonded body has cylindrical shape. In addition, coating material is sprayed on the outmost circumference of the grinded bonded body, and is dried and hardened for 2 hours at 700° C. Thereby, the sealed honeycomb structure is obtained. Coating material is the same as the bonding material. A diameter of a bottom surface is 143.8 mm and a length of the cell in the extending direction is 152 mm in the obtained honeycomb structure. The sealed honeycomb structure of segment type of Example 10 is represented by "segment" in the "structure of honeycomb structure" column of Table 1.

In the outlet cell where the reinforcing part is formed, the ratio of "the intersecting distance L of the intersecting part of the walls that is the distance from the surface of the reinforcing part of the outlet cell to the surface of another cell disposed across the intersecting point of the walls dividedly forming the outlet cells" to the "average thickness T of the wall except the reinforcing part" (hereinafter, it will be called an "intersection ratio of the outlet cell (L/T)") is 2.0.

Meanwhile, in the inlet cell where the reinforcing part is not formed, the ratio of the "intersecting distance L of the intersecting part of the walls that is the distance from the surface of the inlet cell to the surface of another cell disposed across the intersecting point of the walls dividedly forming the inlet cells" to the "average thickness T of the wall except the reinforcing part" (hereinafter, it will be called "intersection ratio of the inlet cell (L/T)") is 1.4.

The same tests as Example 1 are performed on the sealed honeycomb structure. The results are shown in Table 2.

COMPARATIVE EXAMPLES 4 TO 6 AND 8

The sealed honeycomb structure is manufactured by the same method manufacturing Example 10 except that the sealing length of the sealing portion, and the cell where the reinforcing part is formed (whether the reinforcing part exists or not), the length of the reinforcing part, the wall thickness and the cell pitch in the honeycomb structure are changed as shown in Table 1, and the intersection ratio (L/T) of the inlet cell and the intersection ratio (L/T) of the outlet cell are changed as shown in Table 1. The same tests as Example 1 are done on the obtained sealed honeycomb structure. The results are shown in Table 2. In addition, "exist" in Table 1 without a specific value indicates that the reinforcing parts are formed at all the corner portions of Examples and Comparative Examples, and "non-exist" in Table 1 without a specific value indicates that the reinforcing parts are not formed at all the corner portions of Examples and Comparative Examples.

As shown in Table 2, the sealed honeycomb structures of Examples 1 to 15 have small maximum principal stress and excellent durability. Particularly, if the length of the sealing portion is larger than or equal to the sealing length of the outlet side sealing portion such as the sealed honeycomb structure of Example 2 is, the maximum principal stress can be greatly reduced. Meanwhile, compared with Comparative Example 1, the maximum principal stress is not reduced and durability is hardly improved in Comparative Example 2 where the reinforcing part is formed at the corner portion of the inlet cell.

In addition, if the intersection ratio (L/T) of the outlet cell is within 1.5 to 9.3 (for example, the intersection ratio (L/T) of the outlet cell in Example 12 is 9.3), improvement of durability and suppression of increase of the pressure loss are balanced. If the intersection ratio (L/T) of the outlet cell is greater than the above-described range, suppression of increase of the pressure loss is reduced a little. Particularly, if the intersection ratio (L/T) of the outlet cell is smaller than or equal to 9.3, durability may be sufficiently improved and increase of the pressure loss may be suppressed favorably.

In addition, effect of the sealed honeycomb structure of segment type is substantially the same as that of the monolithic sealed honeycomb structure.

INDUSTRIAL APPLICABILITY

The sealed honeycomb structure of the present invention can be used as a filter for purifying gas exhausted from an internal combustion engine such as a diesel engine or various combustion devices.

The invention claimed is:
1. A sealed honeycomb structure comprising:
porous walls dividedly forming a plurality of cells extending from an end surface of an inlet side to an end surface of an outlet side of the sealed honeycomb structure, the plurality of cells being a plurality of fluid channels;
an outlet side sealing portion mounted at openings of predetermined cells in the end surface of the outlet side so as to form inlet cells where the end surface of the inlet side is open and the end surface of the outlet side is sealed; and
an inlet side sealing portion mounted at openings of remaining cells in the end surface of the inlet side so as to form outlet cells where the end surface of the outlet side is open and the end surface of the inlet side is sealed,
wherein at least one cell among the outlet cells is a reinforced cell where reinforcing parts for reinforcing the outlet cells are formed at at least one corner portion at which the porous walls on a cross-section vertical to an extending direction of the outlet cells cross each other,
wherein the inlet cells are provided with reinforcing parts for reinforcing the inlet cells at at least one corner portion at which the porous walls on the cross-section vertical to the extending direction of the inlet cells cross each other,
wherein a total number of the at least one corner portion reinforcing the inlet cells is smaller than a total number of the at least one corner portion reinforcing the outlet cells,
wherein the reinforcing parts of the outlet cells are formed at a section of the sealed honeycomb structure from the end surface of the outlet side of the sealed honeycomb structure in the extending direction of the outlet cells, and
wherein the reinforcing parts of the inlet cells are formed at a section of the sealed honeycomb structure from the end surface of the inlet side of the sealed honeycomb structure in the extending direction of the inlet cells.

2. The sealed honeycomb structure of claim 1, wherein a length of the reinforcing parts in the extending direction of the inlet and outlet cells is larger than or equal to a length of the outlet side sealing portion or the inlet side sealing portion in the extending direction of the inlet and outlet cells.

3. The sealed honeycomb structure of claim 1, wherein the reinforcing part parts are formed on a section corresponding to a range smaller than or equal to ⅓ of the length of the sealed honeycomb structure in the extending direction of the inlet and outlet cells from the end surface of the outlet side or the end surface of the inlet side of the sealed honeycomb structure.

4. The sealed honeycomb structure of claim 1, wherein the reinforced cell comprises a reinforced corner portion at which the reinforcing parts are formed and a non-reinforced corner portion at which the reinforcing parts are not formed.

5. The sealed honeycomb structure of claim 1, wherein the reinforced cell is configured that the reinforcing parts are formed at all the corner portions of the reinforced cell at the end surface of the outlet side or the end surface of the inlet side of the sealed honeycomb structure.

6. The sealed honeycomb structure of claim 1, wherein the inlet cells and the outlet cells are alternately disposed across the porous walls.

7. The sealed honeycomb structure of claim 1, wherein a ratio of an intersecting distance of an intersecting part of the walls to an average thickness of the walls without the reinforcing parts are within a range of 1.5 to 9.3, and
wherein the intersecting distance of the intersecting part of the walls is a distance from a surface of the reinforcing parts of the reinforced cell to a surface of another cell disposed across an intersecting point of the walls dividedly forming the reinforced cell.

8. The sealed honeycomb structure of claim 1, wherein each reinforcing parts occupies 0.05 to 20% of an area of an opening portion without the reinforcing parts on the cross-section vertical to the extending direction of the inlet and outlet cells.

* * * * *